US008908477B2

(12) United States Patent
Peters et al.

(10) Patent No.: US 8,908,477 B2
(45) Date of Patent: Dec. 9, 2014

(54) METHOD FOR AUTHENTICATING AN ELECTRONIC WATCH AND ELECTRONIC WATCH FOR IMPLEMENTING THE METHOD

(71) Applicant: ETA SA Manufacture Horlogere Suisse, Grenchen (CH)

(72) Inventors: Jean-Bernard Peters, Pieterlen (CH); Francois Klopfenstein, Delemont (CH); Emmanuel Fleury, Moutier (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 28 days.

(21) Appl. No.: 13/644,222

(22) Filed: Oct. 3, 2012

(65) Prior Publication Data

US 2013/0170327 A1 Jul. 4, 2013

(30) Foreign Application Priority Data

Oct. 4, 2011 (EP) ..................................... 11183843

(51) Int. Cl.

| | |
|---|---|
| ***G04B 19/04*** | (2006.01) |
| ***G04B 19/06*** | (2006.01) |
| ***G04C 15/00*** | (2006.01) |
| ***G05B 19/00*** | (2006.01) |
| ***G05B 23/00*** | (2006.01) |
| ***G06F 7/00*** | (2006.01) |
| ***G06K 19/00*** | (2006.01) |
| ***G08B 29/00*** | (2006.01) |
| ***G08C 19/00*** | (2006.01) |
| ***H04B 1/00*** | (2006.01) |
| ***G04G 99/00*** | (2010.01) |
| ***G04G 21/00*** | (2010.01) |

(52) U.S. Cl.

CPC .............. *G04G 99/006* (2013.01); *G04G 21/00* (2013.01)

USPC .............. 368/62; 368/228; 340/5.55; 340/5.6

(58) Field of Classification Search

USPC .................................................. 340/5.55, 5.6

See application file for complete search history.

(56) References Cited

U.S. PATENT DOCUMENTS 3,600,637 A * 8/1971 Bergkvist ...................... 361/172
4,403,869 A * 9/1983 Crutcher ......................... 368/10

(Continued)

FOREIGN PATENT DOCUMENTS

CN 101305385 A 11/2008
EP 1 424 658 A1 6/2004

(Continued)

OTHER PUBLICATIONS

European Search Report issued Jan. 20, 2012 in corresponding European Application No. 11 18 3843 filed on Oct. 4, 2011 (with an English Translation).

*Primary Examiner* — Amy Cohen Johnson
*Assistant Examiner* — Daniel Wicklund
(74) *Attorney, Agent, or Firm* — Oblon, Spivak, McClelland, Maier & Neustadt, L.L.P.

(57) ABSTRACT

A method is provided to authenticate a watch. The watch includes at least one processing and control circuit provided with a time base, hands to indicate a time, the hands being driven by a motorized device controlled by the processing and control circuit, and a device to store identification data. The method includes enabling at least one activation member of the watch, which is connected to the processing and control circuit, to change into watch authentication mode. The method includes operating an indicator device of the watch, which includes the hands, after enabling the activation member so that at least one of the hands is driven by the motorized device to be moved in succession into time indicating positions on a time-indicating dial to indicate successive digits or numbers of an identification code of at least one of a brand and a serial number of the watch to be authenticated.

14 Claims, 4 Drawing Sheets

(56) References Cited

U.S. PATENT DOCUMENTS

| | | | | | |
|---|---|---|---|---|---|
| 5,258,746 | A * | 11/1993 | Leitten et al. | 340/574 |
| 5,329,501 | A * | 7/1994 | Meister et al. | 368/10 |
| 5,572,488 | A * | 11/1996 | Yamada et al. | 368/10 |
| 6,412,976 | B1 * | 7/2002 | Dechery et al. | 368/281 |
| 6,825,751 | B1 * | 11/2004 | Kita et al. | 340/5.61 |
| 6,896,403 | B1 * | 5/2005 | Grau | 368/190 |
| 2004/0113819 | A1 * | 6/2004 | Gauthey et al. | 341/34 |
| 2006/0144946 | A1 | 7/2006 | Kuriyama et al. | |

FOREIGN PATENT DOCUMENTS

| | | | |
|---|---|---|---|
| EP | 1 804 195 | A1 | 7/2007 |
| EP | 2 015 149 | A2 | 1/2009 |
| FR | 2 488 704 | A1 | 2/1982 |
| FR | 2 630 228 | A1 | 10/1989 |
| WO | WO 2007/030397 | A2 | 3/2007 |

* cited by examiner

METHOD FOR AUTHENTICATING AN ELECTRONIC WATCH AND ELECTRONIC WATCH FOR IMPLEMENTING THE METHOD

This application claims priority from European Patent Application No. 11183843.9 filed Apr. 10, 2011, the entire disclosure of which is incorporated herein by reference.

FIELD OF THE INVENTION

The present invention concerns a method for authenticating an electronic watch, which may have a time display using hands driven by motorised means. The watch includes, in particular, at least a processing and control circuit provided with a time base and a means of storing personal data and/or identification data of a brand and/or a serial number and/or operating settings of the watch. The processing and control circuit may be, for example, a microcontroller unit.

The present invention also concerns an electronic watch for implementing the watch authentication method.

BACKGROUND OF THE INVENTION

In order to be able to authenticate a mechanical or electro-mechanical watch, the watch may be provided with an identification mark, particularly during manufacture. This identification mark may take the form of a code applied, for example, to an external part of the watch case which is not directly visible when the watch is worn on the wrist, to avoid making said watch less attractive. This code may be, for example, a coded image, such as a two-dimensional bar code as defined in EP Patent Application No. 1 804 195 A1. This coded image, which is obtained by specific calculation algorithms, is based on the identifier of the watch, which is generally sold with a card bearing said watch identifier. This code may be decrypted by a decrypted operation using decryption keys supplied by the parent company. Thus, in order to authenticate said watch, a specific computing device has to be used, which is slow and complicated and consequently a drawback.

The mechanical or electro-mechanical watch may thus include a personalised RFID circuit chip inside the watch case or camouflaged on an external part of the watch case. The identification code is thus stored in said RFID circuit chip so as to allow a nearby read device to read said identification code by wireless communication. This mark improves the protection of the watch against counterfeiting by authenticating the origin of said watch. However, as previously, it is necessary to have specific external means to be able to read and recognise the watch identification data, which constitutes a drawback.

FR Patent Application No. 2 630 228 A1 may also be cited, which discloses a perpetual calendar watch. This watch is provided with hands for the time display. The watch also includes an electronic control circuit and a time-setting stem, which can be subject to several manipulations, each relating to a determined function. The electronic circuit in the watch case is capable of recognising a code, which corresponds to a determined series of manipulations performed with the time-setting stem. This permits the change into a perpetual calendar programming mode, and particular programming to be carried out. The electronic circuit can recognise whether the code for the change into a programming mode has been correctly entered. However, this electronic circuit cannot operate the watch so as to provide authentication information regarding said watch.

In FR Patent Application No. 2 488 704 A1, in addition to the time base components, the analogue or digital watch includes a means of selecting a code to be transmitted by indicating the selection on a display device. The watch further includes a means of transferring the code via an electro-optical part, which displays the code in binary form. The code transmitted by the electro-optical part can be picked up by an opto-electronic processing device. As previously indicated, an external processing device has to be used to read the code or authenticate said watch, which constitutes a drawback.

SUMMARY OF THE INVENTION

It is therefore a main object of the invention to overcome the aforementioned drawbacks by proposing a method for authenticating an electronic watch which can be started quickly and which can check the authenticity of the watch without the use of external instruments.

The present invention therefore concerns a method for authenticating an electronic watch, said watch including at least one processing and control circuit provided with a time base, and a means of storing personal data and/or identification data of a brand and/or serial number and/or operating parameters of the watch, wherein the method includes the steps consisting in:

- enabling at least one activation member of the watch, which is connected to the processing and control circuit, to change into watch authentication mode, and
- operating an indicator device of the watch after enabling the activation member to indicate watch authentication information to the watch user visually, acoustically or by tactile sensation.

Particular steps of the authentication method are defined in the dependent claims 2 to 9.

One advantage of the electronic watch authentication method according to the invention lies in the fact that an indicator device belonging to the watch can be started once an activation member has been activated for the change into authentication mode. When started, this indicator device can provide authentication information straight to the user of the watch to certify the authenticity of the watch. The indicator device can indicate the authentication information visually or acoustically or by tactile sensation particularly via a vibrating element.

Advantageously, one or several time-indicator hands of the watch can form part of the indicator device. To achieve this, the processing and control circuit is configured and programmed to control motorised means. This motorised means drives one or more hands once the activation member has been started and activates the change into authentication mode. The hand or hands can thus indicate in succession each digit or number of at least one part of an identification code of the watch brand and/or a serial number on the watch dial to authenticate the watch. The hand or hands can also describe rotating movements specific to the watch authentication. The part of the identification code displayed by the hand or hands on the dial can be compared to the identification code marked on a card provided with said watch when it is sold.

The invention therefore concerns an electronic watch for implementing the authentication method, wherein the watch includes at least one processing and control circuit provided with a time base, and a means of storing personal data and/or identification data of a brand and/or serial number and/or operating parameters of the watch, wherein the watch includes at least one activation member connected to the processing and control circuit, and said member can be enabled to operate, in authentication mode, an indicator device of the watch capable of indicating visually, acoustically or by tactile sensation, information for authenticating the watch to the watch user.

Specific embodiments of the electronic watch are defined in the dependent claims 11 to 21.

One advantage of the electronic watch for implementing the authentication method lies in the fact that it includes an activation member arranged to be activated in a certain way to cause a processing and control circuit to change into the watch authentication mode. An indicator device of the watch can thus be operated by the circuit to provide watch authentication information once the activation member has been activated. This indicator device may include one or several hands moved on the watch dial, or one or two date discs, or one or several light or acoustic signals, or a vibrating element.

BRIEF DESCRIPTION OF THE DRAWINGS

The objects, advantages and features of the electronic watch authentication method and the electronic watch for implementing the same will appear more clearly in the following non-limiting description made with reference to the drawings, in which.

DETAILED DESCRIPTION OF THE INVENTION

In the following description, all those components of the electronic watch for implementing said watch authentication method, which are well known to those skilled in the art in this technical field, are described only in a simplified manner. The following description is mainly based on an electronic watch with a time display using hands, although the authentication method may be applied to other electronic watch types.

Figure 1:
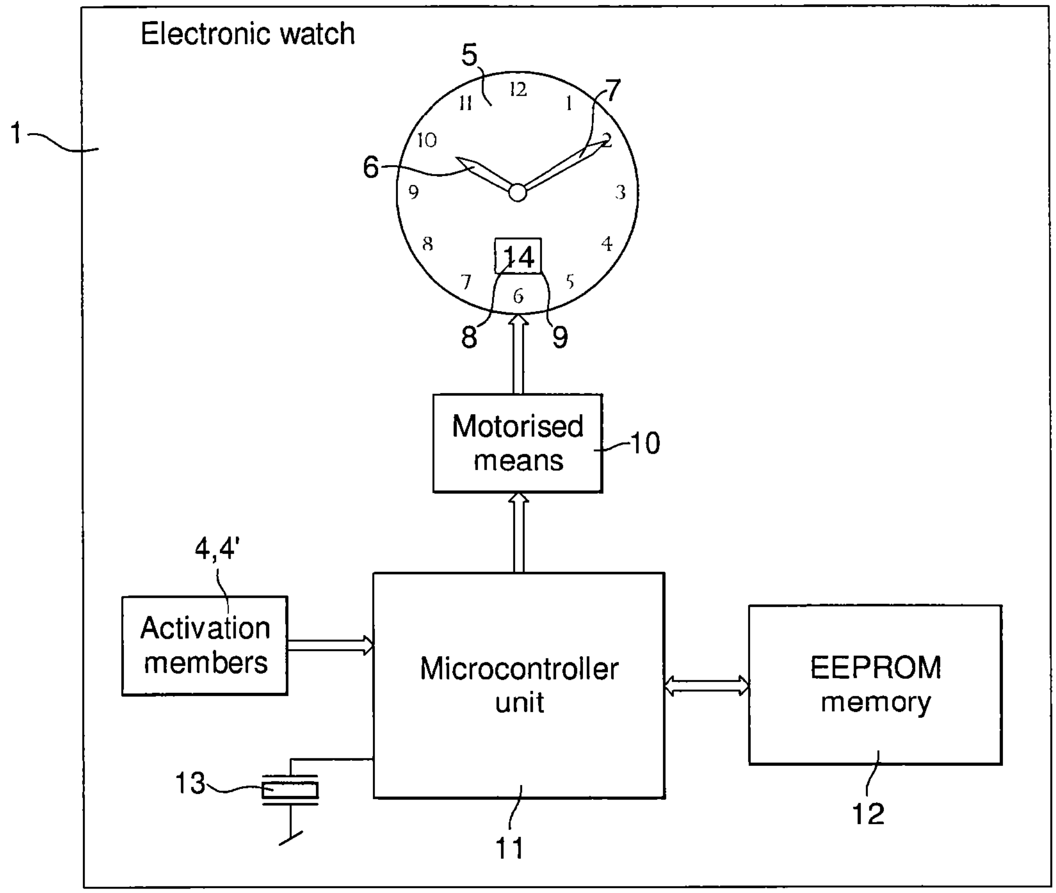
FIG. 1 shows a schematic view of various electronic units of an electronic watch displaying the time via hands for implementing the authentication method of the invention.

FIG. 1 shows schematically various electronic elements of electronic watch 1, which, in this embodiment, is an electronic watch with a time display using hands 6 and 7. This electronic watch may also include at least one date disc 8, which is, for example, rotatably mounted about an axis perpendicular to a bottom plate of the watch movement, for example around a central axis of said watch. This date disc is arranged underneath a time indicator watch dial 5. In a normal operating mode of said watch, each digit or number of the date disc is shown in series day after day through a reading aperture 9 of time indicator dial 5.

Electronic watch 1 also includes a processing and control circuit 11, which may preferably be a microcontroller processing unit and a quartz resonator 13 of an oscillator stage of the processing and control circuit to define a time base. The microcontroller unit may include, for example, a low power 8-bit CoolRISC microcontroller under the name EM6812 manufactured by EM Microelectronic-Marin in Switzerland.

Electronic watch 1 further includes a motorised means 10, which is formed, for example, of one or several micromotors and various gears for activating the hands and the date disc. This motorised means is controlled by the processing and control circuit mainly for driving hands 6 and 7 on watch dial 5 and for rotating the date disc. More than two hands may also be provided in the case, for example, of a chronograph watch.

Two date discs 8 may also be mounted one on top of the other or one beside the other. These date discs may each be rotatably mounted about a respective or common axis perpendicular to the watch plate. These date discs may be driven independently of each other or in relation to each other by motorised means 10 to indicate the days of the month.

Electronic watch 1 further includes one or several activation members 4, 4' connected to processing and control circuit 11, and a storage means 12. The activation members are arranged to control the execution of various watch operations or functions via the processing and control circuit 11, which is programmed for this purpose. The storage means may store personal data and/or identification data of a watch brand and/or serial number of a particular watch, and operating parameters of the watch. These operating parameters of the watch allow processing and control circuit 11 to control the normal operation of said watch and also the execution of the watch authentication mode explained below. Once the authentication mode has been activated by at least one enabled activation member 4, 4', an indicator device is provided to indicate the watch authentication information visually, acoustically or by tactile sensation to the user of the watch.

The storage means may be partly formed by a non-volatile EEPROM memory 12 or a Flash memory, which stores one or several identification codes of the brand and/or serial number of the watch. In a known manner, this type of memory may be arranged to prevent reprogramming after the watch has been manufactured and once one or several identification codes have been stored. This makes it more difficult to counterfeit said watch.

If processing and control circuit 11 is formed of a microcontroller processing unit, storage means 12 may be partly or entirely integrated in said microcontroller processing unit. This microcontroller unit may also include different types of memory from the EEPROM or Flash memory for storing operating programmes of said unit.

Activation members 4, 4' may be formed, for example, by a conventional stem/crown, a push-button, one or more capacitive touch keys arranged on the watch glass or on part of the watch case, and a bezel. Each activation member may be electrically connected to the processing and control circuit to control the execution of a specific operation or function. Several activation members of different types may be fitted to said watch to control the execution of a particular function.

Where the activation member is a stem/crown 4, the crown is able to occupy a first rest position and a second position pulled out towards the outside of the watch case. In the first rest position, the stem of the crown may, for example, close an electric contact of processing and control circuit 11. However, in a second position pulled out towards the outside of the watch case, the electric contact of the processing and control circuit is open. Consequently, the processing and control circuit may be activated to change into an authentication mode by opening and closing the electric contact by activating the stem/crown. Pulling the crown out to its second external position and pushing it back into its first rest position within a determined time period, for example between 1 and 4 seconds, changes said processing and control circuit into authentication mode.

It is to be noted that it is also possible to envisage the electric contact being open in the first rest position of the stem/crown. This electric contact may be closed when the stem/crown is in the second position pulled out towards the outside of the watch case according to the electronic processing and control circuit provided for this purpose.

Figure 3A:
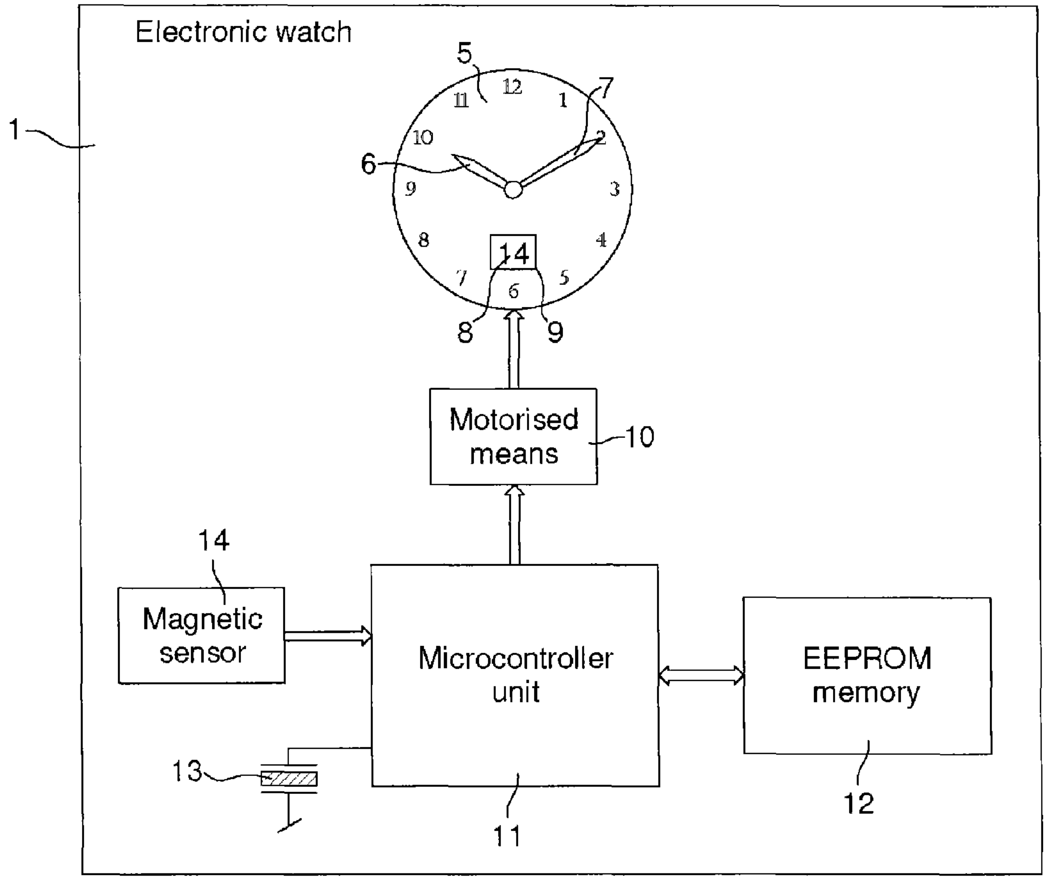
FIGS. 3*a* and 3*b* show another illustrative example of an activation member.
Figure 3B:
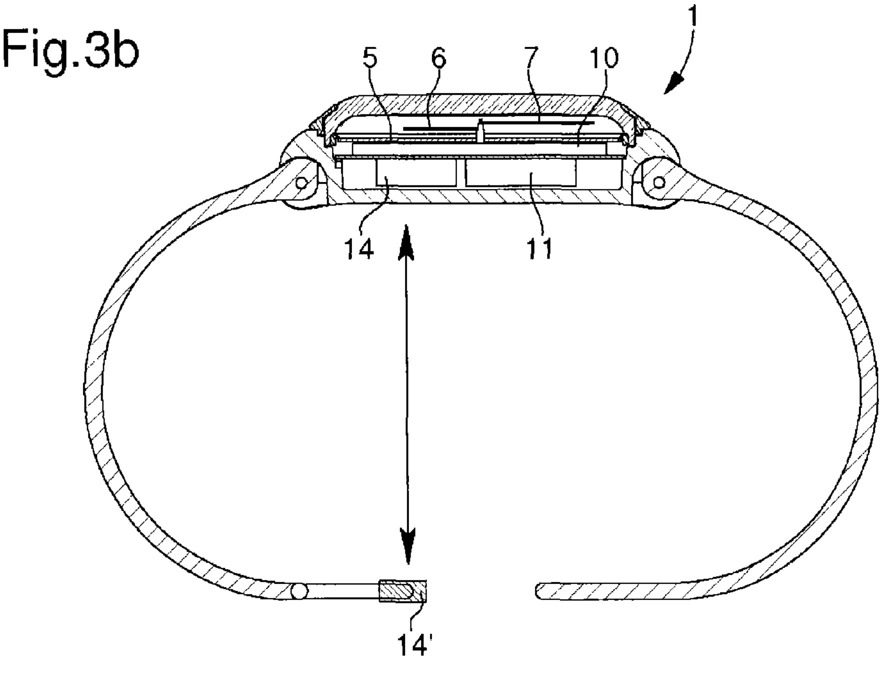

As shown in FIGS. 3*a* and 3*b*, a shock sensor, arranged in connection with the watch glass, or a magnetic sensor 14 connected to the processing and control circuit may also be provided as activation member. Said magnetic sensor 14, which is arranged inside the watch case, can be activated by means of a permanent magnet. This permanent magnet may be placed on a bracelet or strap of said electronic watch. A tongue of a buckle of the bracelet or strap may be a magnet 14' for activating the magnetic sensor 14, in order to change the processing and control circuit into authentication mode.

Figure 4A:
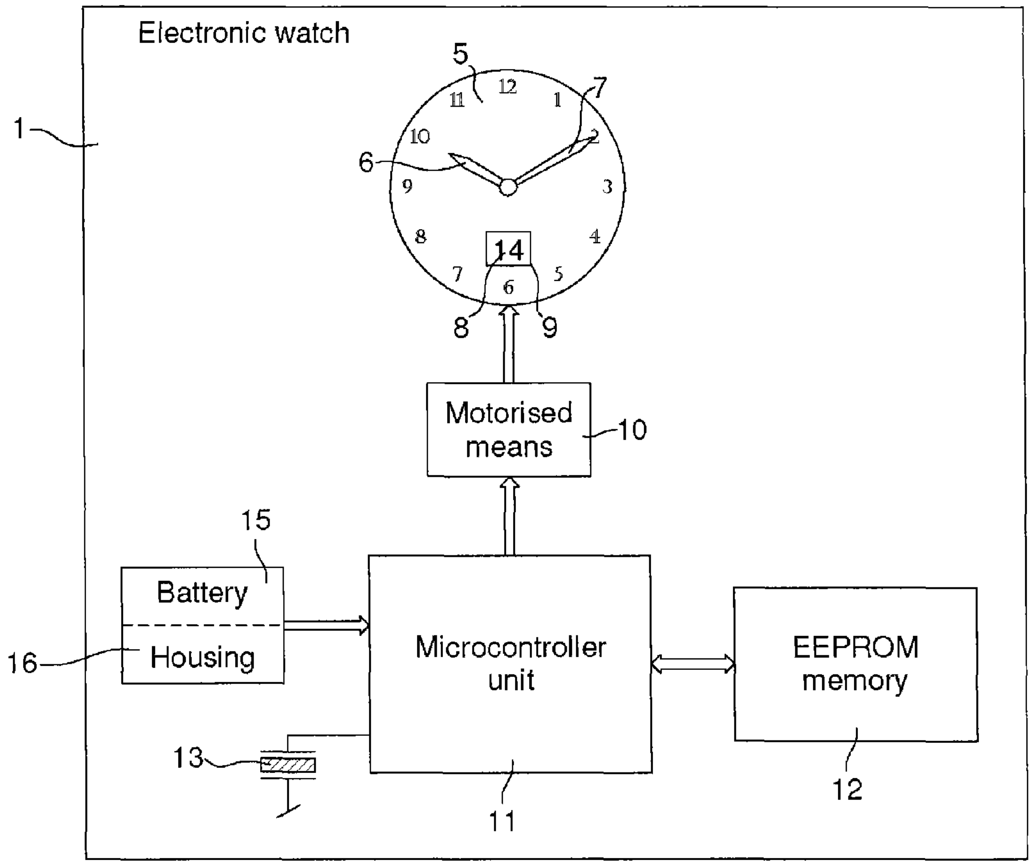
FIGS. 4*a* and 4*b* show a further illustrative example of an activation member.
Figure 4B:
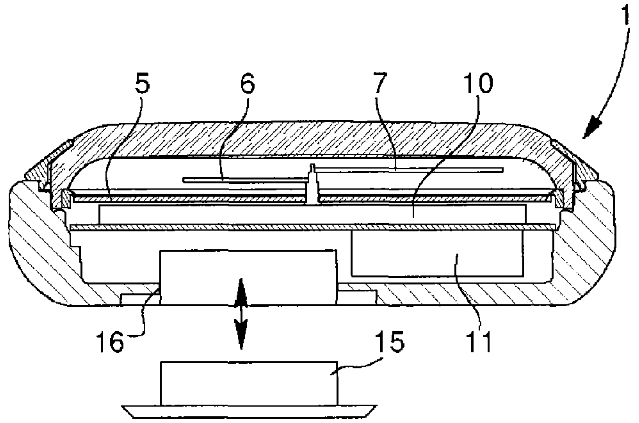

As shown in FIGS. 4*a* and 4*b*, a battery 15 in a battery housing 16 of the watch, which is connected to processing and control circuit 11, may also be provided as activation member. The battery 15, which is electrically connected in its battery housing 16, can provide electric power to the electronic watch components. The battery 15 can be removed from the battery housing 16 and immediately replaced in the battery housing to provide an electric initialization signal to the processing and control circuit. This electric initialization signal causes the processing and control circuit to change into watch authentication mode.

Figure 2:
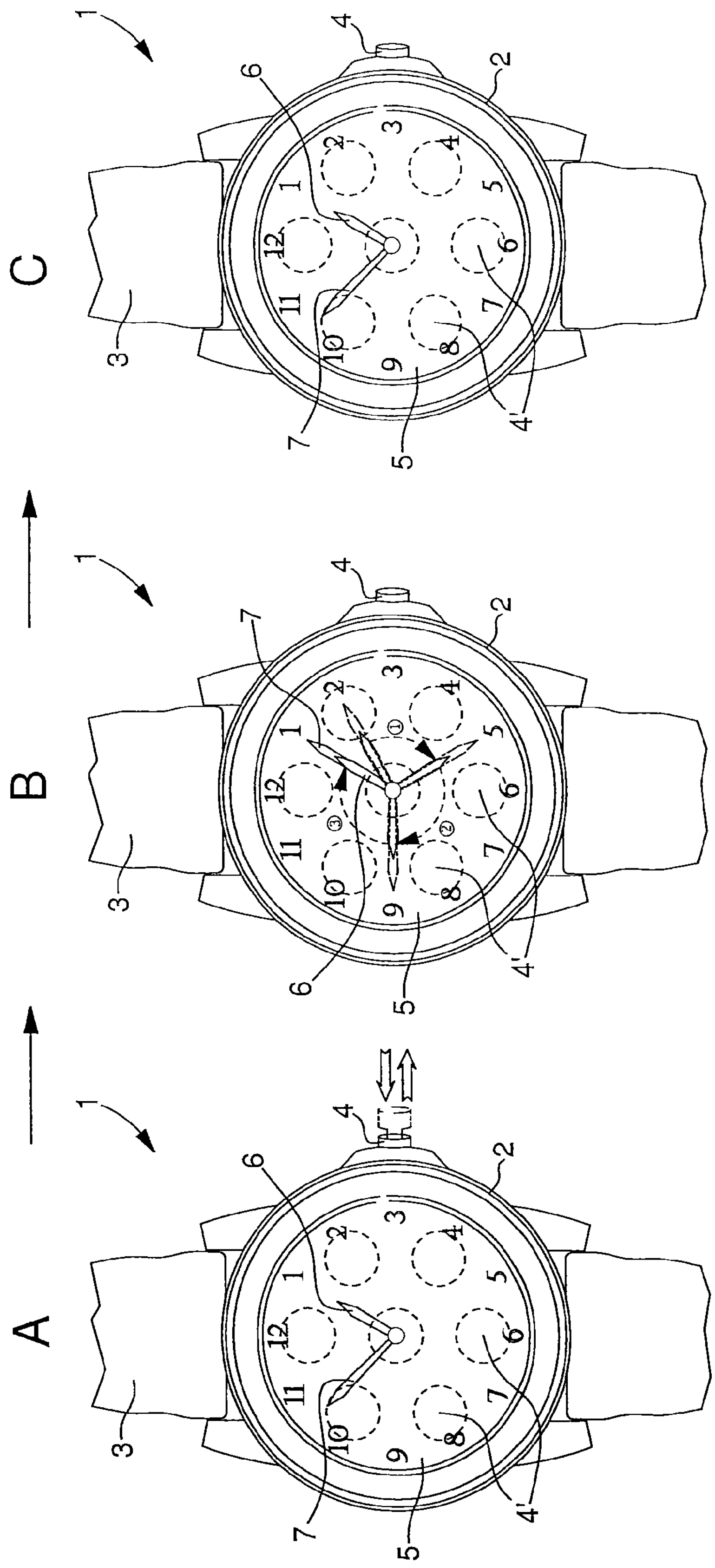
FIG. 2 shows a simplified view of various steps of one embodiment of the authentication method for an electronic watch displaying the time via hands in accordance with the invention.

To explain the electronic watch authentication method according to the invention more clearly, FIG. 2 shows various steps of said authentication method for an electronic watch 1. In this embodiment, electronic watch 1 displays the time via at least two hands 6 and 7 on a dial 5 with numbered hour markings. The electronic wristwatch includes a bracelet 3, fixed to a watch case 2. The activation members of the watch are a stem/crown 4 and several capacitive touch keys 4' arranged on the watch glass at a sufficient distance from each other. Another push-button (not shown) or the stem/crown may be used to start the touch keys. However, these touch keys may also be permanently enabled. These touch keys 4' may be used to enter an authentication mode or to enter data or settings, or to select different menus or functions of the watch. To enter authentication mode, it is possible to envisage firstly a short application of pressure on at least one touch key followed by a long application of pressure, or activating several touch keys at the same time.

In the embodiment shown in FIG. 2, stem/crown 4 may preferably be used to change from a time mode into watch authentication mode. To achieve this and as shown under the reference A in FIG. 2, stem/crown 4 must first of all be pulled out from its first rest position to its second position towards the outside of the watch case. This opens an electric contact connected to the processing and control circuit. Stem/crown 4 is then pushed back from its second position to its first rest position to close the electric contact of the processing and control circuit again. This operation must be carried out within a determined time period, for example between 1 and 4 seconds, in order to perform the change from time mode, which is shown with the reference A in FIG. 2, to an authentication mode shown with the reference B in FIG. 2.

In authentication mode, at least one hand 6 or 7 forms part of a device indicating watch authentication information to the person wearing the watch. This authentication information may be at least part of an identification code of the brand and/or serial number of the watch. Preferably, the two hands 6 and 7, or three hands of a chronograph watch, can be used to indicate the digits or numbers of at least one part of an identification code to be visually indicated to the wearer of the watch. However, one indicator hand may be enough for this purpose, for example the minute or seconds hand. The two or three hands may be superposed to be driven together by the motorised means on the basis of a command supplied by the processing and control circuit.

Superposed hands 6 and 7 are driven by the motorised means, to be moved in succession into time indicator positions on dial 5 to indicate the successive digits or numbers of an identification code to be checked. Under the reference B in FIG. 2, superposed hands 6 and 7 are moved to indicate in succession the number 2, then the number 5, then the number 9 and finally the number 1, to give part of the desired identification code 2591. This part of the identification code indicated by the hands can be compared to an identification code of the brand and/or serial number of the watch marked on a card provided when the watch is sold. A single identification code may be provided for a watch brand, whereas the identification code representing a serial number is different for each watch manufactured.

Of course, if two successive digits or numbers are identical, the hands may be moved in a particular manner on the dial to indicate to the user the same successive digits or numbers of the identification code to be checked. In this case, the motorised means may drive the hands, so that, for example, they make one complete rotation on the dial.

The time for changing from one time indicating position to another time indicating position is programmed in the processing and control circuit. Each change time or period of time is set to allow the user to easily check each digit or number indicated on the dial by hands 6, 7. Once the hands have indicated enough of the digits or numbers to authenticate said watch, the hands are reset to their time display state by the motorised means after a defined authentication mode operating period. Normally after 4 seconds, the hands, controlled by the processing and control circuit, are driven by the motorised means to display the time again as shown under the reference C in FIG. 2. Any time delay caused by the authentication mode operation period is of course corrected in a known manner by a counter integrated in the microcontroller unit.

In a variant for authenticating the watch, at least one hand 6 or 7, or the two superposed hands 6, 7 are moved in succession after each activation of activation member 4, 4' into the dial time indicating positions. This means that after each activation of the activation member provided for this purpose, said member can indicate successive digits or numbers of an identification code of the brand and/or serial number of the watch to be checked. The two hands 6, 7 may also be moved alternately by the motorised means to indicate separately the successive digits or numbers of the identification code of the watch to be checked.

Instead of providing a numbered indication of an identification code, in authentication mode, at least one hand 6 or 7 may be moved in rotation on the dial to make one or several rotational movements in a clockwise or anti-clockwise direction. The hand or hands may also make one or several revolutions on the dial in order to stop in a determined position so as to provide watch authentication information.

In order to provide authentication information via the indicator device, one or two date discs may be used which are driven by the motorised means controlled by the processing and control circuit. The date disc or discs can thus be moved to indicate successive digits or numbers of an identification code of the brand and/or serial number of the watch to be authenticated through an aperture in the dial. The date discs may be driven in rotation independently of each other. As previously mentioned, the date disc or discs may be moved in succession after each activation of the activation member 4, 4' provided for this purpose. This means that the successive digits or numbers of an identification code of the brand and/or serial number of the watch to be authenticated can be indicated to the user through the aperture in the dial.

Electronic watch 1 may further include an LCD or LED or OLED display device for example (not shown) in order to display various data. The watch display device may also be an electroluminescent or e-paper or electrophoretic display. This display device may also be used as the indicator device in authentication mode. This indicator device can display in succession or instantaneously one part of an identification code of the brand and/or serial number of the watch to be checked.

Several light sources, forming for example an array of light emitting diodes may also be provided as the indicator device. These light sources are controlled by the processing and control circuit when the activation member is enabled for the change into authentication mode.

The indicator device may also be a sound generator for indicating acoustically either a succession of identification digits or numbers or for providing a specific piece of music of the watch to be authenticated. This acoustic indicator device is started by the processing and control circuit when the activation member is enabled for the change into authentication mode. The succession of digits or numbers to be acoustically indicated to the user is stored in the storage means.

From the description that has just been given, several variants of the authentication method for an electronic watch and the electronic watch for implementing the method can be devised by those skilled in the art without departing from the scope of the invention defined by the claims. A device generating information by tactile sensation, such as a vibrating element on the wrist, may be provided as the indicator device. A combination of different types of indicator device may be provided, such as a visual indicator device combined with an acoustic or light device. The indication by an acoustic or light device may be easily picked up by an apparatus, such as a mobile telephone provided with an application for checking the authenticity for example of a watch. Several types of activation member may also be provided for activating the watch, so that it changes into watch authentication mode. For a chronograph watch, a seconds hand can be used, which is located at the centre and which can be driven independently of the driving of the other watch hands.

What is claimed is:

1. A method for authenticating an electronic watch, said watch including at least one processing and control circuit provided with a time base, hands to indicate a time, said hands being driven by a motorized device which is controlled by the processing and control circuit, and a device to store identification data of at least one of a brand and a serial number, wherein the method comprises:

enabling at least one activation member of the watch, which is connected to the processing and control circuit, to change into watch authentication mode, and operating an indicator device of the watch, which includes said hands, after enabling the activation member so that at least one of the hands is driven by the motorized device to be moved in succession into time indicating positions on a time-indicating dial to indicate successive digits or numbers of an identification code of at least one of the brand and the serial number of the watch to be authenticated.

2. The authentication method according to claim 1, wherein, in authentication mode, the processing and control circuit is programmed to operate the motorized device to move at least one hand from a time indicating position to a successive time indicating position after determined time periods to allow the user to check each digit or number indicated, and wherein the hands are reset to their time display state by the motorized device after a defined authentication mode operating period.

3. The authentication method according to claim 1, wherein, in authentication mode, at least one hand is moved in succession after each activation of the activation member into the time indicating positions on the dial to indicate successive digits or numbers of the identification code of at least one of the brand and the serial number of the watch to be checked.

4. The authentication method according to claim 1, wherein at least two hands are moved alternately by the motorized device to indicate separately the successive digits or numbers of the identification code of the watch to be checked.

5. The authentication method according to claim 1, wherein at least one hand is moved on the dial to perform one or several rotational movements in a clockwise or anticlockwise direction, or to complete one or several revolutions on the dial, so as to stop in a determined position to provide watch authentication information.

6. An electronic watch for implementing the authentication method according claim 1, wherein the electronic watch comprises:

at least one of the processing and control circuit provided with the time base, the hands to indicate the time, said hands being driven by the motorized device which is controlled by the processing and control circuit, and the device to store identification data of at least one of the brand and the serial number, wherein the watch includes the at least one activation member connected to the processing and control circuit, and said activation member is enabled to operate, in authentication mode, an indicator device of the watch, which includes said hands so that at least one of the hands is driven by the motorized device to be moved in succession into the time indicating positions above the time-indicating dial to indicate visual watch authentication information.

7. The electronic watch according to claim 6, wherein the motorized device is operated by the processing and control circuit in authentication mode to drive at least one hand into time indicating positions on the dial to indicate the digits or numbers of an identification code of at least one of the brand and the serial number of the watch to be authenticated.

8. The electronic watch according to claim 7, wherein, in authentication mode, at least two hands are superposed to be driven together by the motorized device so as to indicate digits or numbers of the identification code of the watch to be authenticated.

9. The electronic watch according to claim 6, wherein the activation member is a stem/crown occupiable in a first rest position in which an electric contact of the processing and control circuit is closed or open, and a second position pulled out towards the outside of a watch case, in which the electric contact of the processing and control circuit is open or closed inversely to the first rest position, and wherein the processing and control circuit is activatable to change into authentication mode by opening and closing the electric contact by activating the stem/crown.

10. The electronic watch according to claim 6, wherein the activation member is at least one capacitive touch key, which is arranged on a watch glass or on a part of the watch case, and wherein the touch key is arranged to be permanently active or to be enabled, to activate the watch authentication mode, by a push-button or a time-setting stem/crown.

11. The electronic watch according to claim 6, wherein the activation member is formed by a battery in a battery housing of the watch, which is connected to the processing and control circuit to supply electric power, wherein the battery is removable from the battery housing and replaced in the battery housing to supply an electric initialization signal to the processing and control circuit for the change into watch authentication mode.

12. The electronic watch according to claim 6, wherein the activation member is formed by a magnetic sensor connected to the processing and control circuit, wherein said magnetic sensor is enabled by a permanent magnet arranged in a bracelet or strap of the watch to change into watch authentication mode.

13. The electronic watch according to claim 6, wherein the activation member is a push-button or a watch bezel or a shock sensor of a watch glass, which is electrically connected to the processing and control circuit.

14. The electronic watch according to claim 6, wherein the indicator device includes a sound generator or vibrating element or one or more light sources, which is controlled by the processing and control circuit.

* * * * *